Patented May 12, 1931

1,804,527

UNITED STATES PATENT OFFICE

KARL DACHLAUER AND EMIL THIEL, OF HOCHST-ON-THE-MAIN, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

AROMATIC SULFONIC ACIDS AND PROCESS OF PREPARING THE SAME

No Drawing. Application filed May 27, 1926, Serial No. 112,131, and in Germany June 2, 1925.

Our present invention relates to substituted aromatic sulfonic acids and a process of preparing them.

We have found that aromatic sulfonic acids substituted by an alkyl group containing less than three carbon atoms are obtainable by causing a strong sulfonating agent to react at an elevated temperature upon a mixture comprising an aromatic hydrocarbon and either methyl or ethyl alcohol.

The expression "a strong sulfonating agent", whenever used in the specification or in the claims, is to be understood as comprising acids equal to, or greater in sulfonating power than monohydrate sulfuric acid, such as oleum, chlorosulfonic acid, or mixtures of chlorosulfonate and oleum and oleum and monohydrate, respectively.

The new products, which are soluble in water to a clear solution, possess the same properties as the hitherto known compounds produced by means of alcohols of high molecular weight and may be advantageously used in the textile industry as emulsifying-, wetting- and milling agents and also for the purpose of splitting fats and oils according to Twitchell's method.

We have furthermore found that the properties of our new compounds can be improved by introducing into their molecule a further substituent of the group including the alkyl residues containing more than two carbon atoms, the aralkyl and the alicyclic residues. This process can be effected according to one of the well-known methods as is apparent from the examples described hereafter.

We have furthermore found that the color of the sulfonic acids produced in the above described manner can be considerably brightened, if the condensation is effected in presence of a small quantity of a phosphorus acid compound, for instance an acid of phosphorus or its halide.

The following examples serve to illustrate our invention:

1. Into a mixture of 46 parts of ethyl alcohol and 128 parts of naphthalene are run at 60–70° C. 300 parts of chlorosulfonic acid; when this operation is terminated the mixture is again stirred for a short time at 110–130° until it is completely soluble in water. The reaction may be illustrated by the following equation:

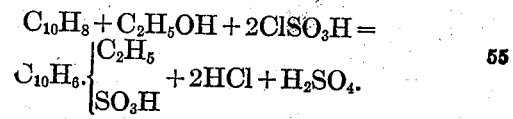

2. A mixture of 46 parts of ethyl alcohol and 220 parts of oleum of 20% strength is caused to act at 80–100° C. upon 128 parts of fused naphthalene and the resulting mass is stirred at 110–130° C. until it is entirely soluble in water. The reaction may be illustrated by the following equation:

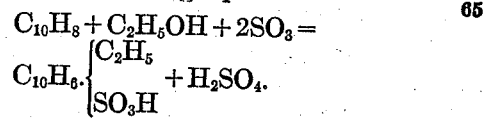

3. The same operations as set forth in Example 1 are carried out with the exception that instead of the chlorosulfonic acid 220 parts of oleum of 20% strength are used.

4. Into a mixture of 142 parts of methylnaphthalene and 46 parts of ethyl alcohol are run at a temperature of between 60–70° 300 parts of chlorosulfonic acid. When the evolution of hydrochloric acid has ceased, the temperature is raised to 110–120° and the mixture is again stirred until it is completely soluble in water. The reaction may be illustrated by the following equation:

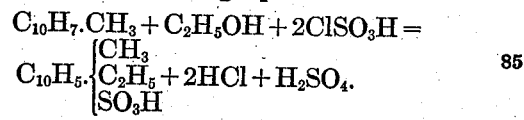

5. The same operations as set forth in Example 1 are carried out with the exception that for the naphthalene used in that example are substituted 92 parts of toluene. The reaction may be illustrated by the following equation:

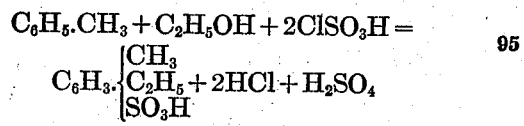

6. Into a mixture composed of 128 parts of naphthalene, 46 parts of ethyl alcohol and 60 parts of isopropyl alcohol are run at 60–70° C. 240 parts of chlorosulfonic acid mixed with 60 parts of oleum; after termination of this operation the temperature is raised to 110–120° and the mass is stirred until the product of the reaction gives a clear solution in water. The reaction may be illustrated by the following equation:

$$C_{10}H_8 + C_2H_5OH + C_3H_7OH + 3ClSO_3H =$$

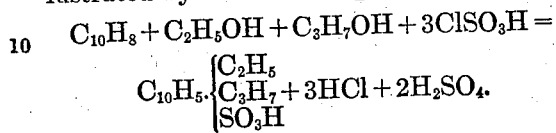

$$C_{10}H_5 \cdot \begin{cases} C_2H_5 \\ C_3H_7 \\ SO_3H \end{cases} + 3HCl + 2H_2SO_4.$$

7. Into a mixture of 128 parts of naphthalene and 32 parts of methyl alcohol are run at 50–60° C. 300 parts of chlorosulfonic acid. When the evolution of hydrochloric acid has ceased, the temperature is raised to 120° and then 74 parts of n-butyl alcohol are run into the mass. The product of the reaction, after being stirred for a short time, is soluble in water and gives therein an entirely clear solution. The reaction may be illustrated by the following equation:

$$a.\ C_{10}H_8 + CH_3OH + 2ClSO_3H =$$

$$C_{10}H_6 \cdot \begin{cases} CH_3 \\ SO_3H \end{cases} + 2HCl + H_2SO_4.$$

$$b.\ C_{10}H_6 \cdot \begin{cases} CH_3 \\ SO_3H \end{cases} + C_4H_9OH + ClSO_3H =$$

$$C_{10}H_5 \cdot \begin{cases} CH_3 \\ C_4H_9 \\ SO_3H \end{cases} + HCl + H_2SO_4$$

8. The operations set forth in Example 1 are repeated, using instead of chlorosulfonic acid a mixture of 168 parts of chlorosulfonic acid and 48 parts of oleum of 20% strength. The sulphonic acid so produced is subsequently condensed at 100–120° with 126 parts of benzyl chloride. The reaction may be illustrated by the following equation:

$$a.\ C_{10}H_8 + C_2H_5OH + ClSO_3H + SO_3 =$$

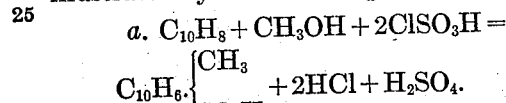

$$b.\ C_{10}H_6 \cdot \begin{cases} C_2H_5 \\ SO_3H \end{cases} + C_6H_5 \cdot CH_2Cl =$$

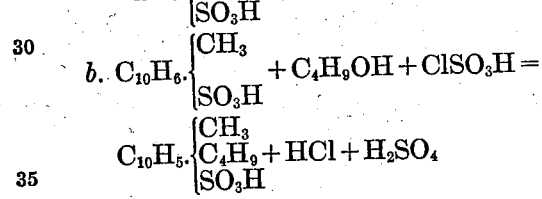

9. Into the reaction mixture obtained according to Example 3 is run at 120° C., while stirring, a mixture of 50 parts of hexahydrophenol and 63 parts of benzyl chloride. The product of the reaction, after being stirred again for a short time, is soluble in water to a clear solution.

10. Into a mixture of 128 parts of naphthalene, 50 parts of ethyl alcohol and 5–10 parts of phosphoric acid (spec. grav. 1,7) are run at 60–70° C. 220 parts of oleum of 20% strength while well stirring and cooling. When this operation is terminated the reaction mixture is heated for 2–3 hours to 140° C. until it gives a clear solution in water. The sulfonic acid thus obtained yields in water a clear solution of a faint yellow color. The reaction takes place as indicated in Example 2.

Instead of phosphoric acid there may be used with the same good result phosphorus pentachloride, phosphorus oxychloride and any other compound acting in a similar manner.

We claim:

1. The process which comprises causing a strong sulfonating agent to act at a temperature of about 50° C. to 140° C. upon a mixture comprising an aromatic hydrocarbon and a compound of the group including methyl alcohol and ethyl alcohol.

2. The process which comprises causing a strong sulfonating agent to act at a temperature of about 50° C. to 140° C. upon a mixture comprising an aromatic hydrocarbon and a compound of the group including methyl alcohol and ethyl alcohol in the presence of a phosphorus acid compound.

3. The process which comprises causing a strong sulfonating agent to act at a temperature of about 50° C. to 140° C. upon a mixture comprising naphthalene and a compound of the group including methyl alcohol and ethyl alcohol.

4. The process which comprises causing a strong sulfonating agent to act at a temperature of about 50° C. to 140° C. upon a mixture comprising naphthalene and ethyl alcohol.

5. The process which comprises causing a strong sulfonating agent to act at a temperature of about 50° C. to 140° C. upon a mixture comprising naphthalene and ethyl alcohol in the presence of phosphoric acid.

6. The process which comprises causing chlorosulfonic acid to act at a temperature of about 50° C. to 140° C. upon a mixture comprising naphthalene and ethyl alcohol in the presence of phosphoric acid.

7. The process which comprises causing a strong sulfonating agent to act at a temperature of about 50° C. to 140° C. upon a mixture comprising an aromatic hydrocarbon, a compound of the group including methyl and ethyl alcohol and an alcohol containing more than two carbon atoms.

8. The process which comprises causing a strong sulfonating agent to act at a temperature of about 50° C. to 140° C. upon a mixture comprising an aromatic hydrocarbon, a compound of the group including methyl and ethyl alcohol and an alcohol containing more than two carbon atoms in the presence of a phosphorus acid compound.

9. The process which comprises causing a strong sulfonating agent to act at a temperature of about 50° C. to 140° C. upon a mixture comprising naphthalene, a compound of the group including methyl and ethyl alcohol and an alcohol containing more than two carbon atoms.

10. The process which comprises causing a strong sulfonating agent to act at a temperature of about 50° C. to 140° C. upon a mixture comprising naphthalene, ethyl alcohol and an alcohol containing more than two carbon atoms.

11. The process which comprises causing a strong sulfonating agent to act at a temperature of about 50° C. to 140° C. upon a mixture comprising naphthalene, ethyl alcohol and isopropyl alcohol.

12. The process which comprises causing a strong sulfonating agent to act at a temperature of about 50° C. to 140° C. upon a mixture comprising naphthalene, ethyl alcohol and isopropyl alcohol in the presence of phosphoric acid.

13. The process which comprises causing chlorosulfonic acid to act at a temperature of about 50° C. to 140° C. upon a mixture comprising naphthalene, ethyl alcohol and isopropyl alcohol in the presence of phosphoric acid.

14. As a new composition of matter the product obtainable by causing chlorosulfonic acid to act at a temperature of about 50° C. to 140° C. upon a mixture comprising naphthalene, ethyl alcohol and isopropyl alcohol in the presence of phosphoric acid.

15. As new products aromatic hydrocarbons substituted by at least one sulfonic acid group, a substituent of the group comprising methyl and ethyl, and a substituent of the group comprising the aralkyl and the alicyclic residues.

16. As new products naphthalene sulfonic acids substituted by a substituent of the group comprising methyl and ethyl and which may be further substituted by a substituent of the group comprising the alkyl residues containing more than two carbon atoms, the aralkyl, and the alicyclic residues.

17. As new products ethyl-isopropyl-naphthalene sulfonic acids.

In testimony whereof, we affix our signatures.

Dr. KARL DACHLAUER.
Dr. EMIL THIEL.